United States Patent [19]

Percy

[11] 4,019,824

[45] Apr. 26, 1977

[54] POSITIVE RING RETAINING SYSTEM

[76] Inventor: Vernon L. Percy, P. O. Box 684, Wedderburn, Oreg. 97491

[22] Filed: Feb. 3, 1976

[21] Appl. No.: 654,929

[52] U.S. Cl. .................................. 403/261; 403/360; 403/374; 85/8.8

[51] Int. Cl.[2] .......................................... F16B 21/00

[58] Field of Search .......... 403/261, 375, 259, 374, 403/344, 360, 366, 367, 368; 308/DIG. 11; 85/8.6, 8.8, 51

[56] References Cited

UNITED STATES PATENTS

| | | | |
|---|---|---|---|
| 473,524 | 4/1892 | Reeves | 403/344 X |
| 684,664 | 10/1901 | Anderson | 85/8.8 X |
| 1,294,792 | 2/1919 | Gray | 403/261 |
| 2,090,449 | 8/1937 | Knudtzen | 403/344 X |
| 2,210,811 | 8/1940 | Kelpsch | 403/DIG. 7 |
| 2,629,908 | 3/1953 | Keck | 85/8.8 UX |
| 3,867,871 | 2/1975 | Shore | 403/261 X |

FOREIGN PATENTS OR APPLICATIONS

| | | | |
|---|---|---|---|
| 907,198 | 6/1945 | France | 85/8.8 |
| 1,229,389 | 4/1971 | United Kingdom | 403/259 |

*Primary Examiner*—Andrew V. Kundrat
*Attorney, Agent, or Firm*—Miller, Morriss & Pappas

[57] ABSTRACT

A positive retaining ring system for axially securing a work element to a shaft which consists of a shaft provided with an annular recess having a trapezoidal cross-sectional configuration and which extends partially below a work element positioned on the shaft against a work element retaining shouler provided thereon. A segmented annular retaining ring having substantially the same trapezoidal cross-sectional configuration mounted in the recess with the vertical side thereof abutting the side of the work element. Clamping means circumferentially mounted on the segmented ring so as to exert an axial force thereagainst to wedge the ring into the annular recess. The resultant wedging force is translated into an axial force against the side of the work element so as to positively lock the work element against the work element retaining shoulder provided on the shaft.

10 Claims, 20 Drawing Figures

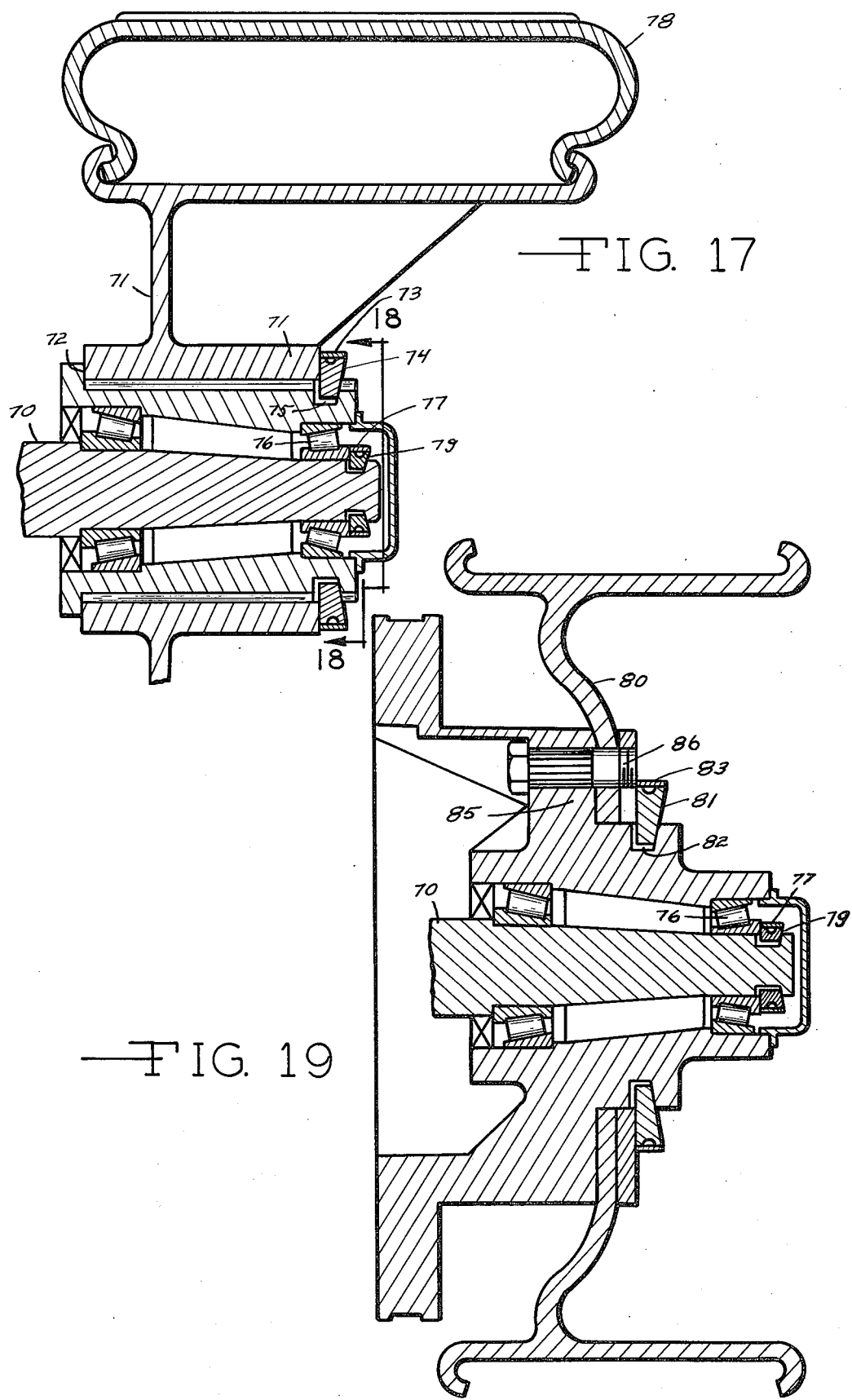

POSITIVE RING RETAINING SYSTEM

This invention relates to positive retaining ring lock system for positively locking work element to a shaft by translating a radial force into an axial locking force against the work element so as to retain it against a work element retaining shoulder on a shaft. The invention further relates to a segmented annular ring having a trapezoidal cross-sectional configuration which is mounted in an annular recess provided on the shaft and which has substantially the same cross-sectional configuration. The recess is provided in the shaft proximate to the work element retaining shoulder. An outer tightening clamp or band is adapted to exert a downward radial force against the segmented annular ring causing it to be wedged into the annular recess. The wedging action translates the radial force into an axial force against the side of the work element so as to lockably retain it against the work element retaining shoulder provided on the shaft.

More specifically, this invention relates to a positive retaining ring system for retaining a work element on a shaft which includes a split or segmented ring having a trapezoidal cross-sectional configuration and a clamping device which selectively acts upon the outer circumferential surface of the ring. The ring is tapered on the forward face away from the retained work element and is split into two or more sections for ease of assembly. The ring sections are assembled into a suitable matching trapezoidally shaped groove or recess on a shaft with the clamping device positioned over the ring segments so as to hole then in place. The clamping device, which in one embodiment of the invention is similar to standard band clamp, is utilized to apply radial pressure to the ring sections so that the tapered surfaces of both ring and recess coact to exert an axial force to retain the work elememt against a work element retaining shoulder provided on the shaft. As used herein the term work element includes, but is not necessarily limited to, sprockets, gears, wheels, bearing assemblies, propellers, cylinder pistons, spring assemblies, railroad journals, racing car wheels and the like.

None of the prior art devices utilize a positive retainer ring locking system which includes the use of a segmented ring having trapezoidal cross-sectional configuration mounted within a similarly shaped annular recess on a shaft so that a wedging action is created when a radial tightening force is exerted against the segmented ring. Further, one of the known prior art devices teach a work element to shaft locking system which utilizes a wedging arrangement to translate a radially exerted tightening force into an axially directed locking force directed against the side of a work element so as to positively retain it against a work element retaining shoulder on a shaft.

Examples of prior art devices are seem in the U.S. Pat. Nos. to Scott 861,143, Kelpsch 2,210,811, T. C. Delaval-Grow 2,136,125, Heimann 2,595,787, Stewart 2,648,557, Humphrey 2,749,162, Searles 1,650,573 and Karle 1,418,379. Most existing prior art commercial retaining rings are designed primarily to act as shoulders for positioning and retaining machine components on shafts. They do not exceed a retentive axial force against the work element being retained. They are normally expanded to place over a shaft and fit into a suitable groove in the shaft. They are ring shaped with one slot to allow expansion and are tempered to make the ring snap back to size after expansion. They maintain a constant pressure against the bottom of the groove and are secure against thrust loads. Some of such prior art devices can be bowed so as to take up end-play between the shaft and the retained part and are called "resilient end-play take-up rings." Such prior art rings are used only to retain, and in no way do they provide any friction force such as to allow a shaft to turn a gear retained by such a retaining ring. Further, they are not designed so as to eliminate the need for drive keys and the like so as to provide a lock/drive method between shaft and hub assembly as is possible by the invention described herein. The invention shown and described herein does not constitute a "take-up" device but is one which forces a positive engagement between a shaft shoulder and retained part by applying pressures on tapered surfaces. This positive fit can be loaded to the point where extremely high torque transmission can be obtained without resorting to keys, splines and the like to provide a mechanically positive drive. This positive retainer ring assembly provides sufficient friction through axial contact pressure to permit torque transmission in practically any amount required.

A need has thus existed for a simple, economical, easily installed and easily maintained work element to shaft locking device which does not require expensive and time-consuming threaded elements in fabrication, installation and use.

A need has further existed for a work element to shaft locking device which exerts an axial retaining force of almost 360° coverage against the side of the work elememt being retained instead of the limited area engaged by the use of traditional five or six stud-bolt retaining means used heretofore.

A need has also existed for a positive retaining ring system to positively hold a precision bearing against its locating shoulder on a shaft with great axial force while virtually eliminating backlash and imparting no angular distortion to the bearing or shaft such as would occur due to the angular pitch of the threads of standard lock nuts used heretofore.

It is therefore an object of this invention to provide a positive retaining work element to shaft locking system which lockably retains a work element against a work element retaining shoulder by exerting an axial force thereagainst.

Another object of this invention is to provide an easily assembled locking arrangement for positively holding machine elements to shafts without the danger of threaded nuts or other threaded retaining means loosening or stripping under axial loads.

Yet another object of this invention is to provide a work element to shaft locking device which allows no backlash to develop under severe usage.

Still another object of this invention is to provide a work element to shaft locking device which is capable of withstanding high axial loads without danger of shearing off under severe shock loading.

A further object of this invention is to provide a work element to shaft locking device which can be easily produced with a reduction of machining costs.

A still further object of this invention is to provide a work element to shaft locking device which is unaffected by fluctuating or reversing loads.

Yet another object of this invention is to provide a work element to shaft locking device which has high fatigue strength under alternating load conditions without the need for cutting threads on large diameter shafts or axles.

Another object of this invention is to provide a work element to shaft locking device which utilizes pressure-friction means to join mechanical assemblies together in a manner which prevents backlash or loosening under shock load conditions, either radial or axial in motion.

Another object of this invention is to provide a positive retaining ring system for securing work elements to shafts whereby the functional contact surfaces are pressed firmly together so as to prevent ingress of dirt and moisture, thereby eliminating the possibility of fretting or corrosion damage.

Yet another object of this invention is to provide a work element to shaft locking device whereby an axial force of sufficient magnitude can be applied so as to attain a positive fit between a shaft shoulder and a retained part whereby extremely high torque transmission can be obtained without resort to keys, splines and the like to provide a mechanically positive drive.

A still further object of this invention is to provide a positive retaining ring system for fastening wheels, hubs, cams, and the like to shafts which is inherently safe due to the fact that threaded parts have been eliminated from the direct load bearing areas.

Another object of this invention is to provide a positive retaining ring system which does not require the use of shrink fit assembly, threaded shafts or studs, nuts, lock washers or other ancillary expensive and difficult to assemble locking or holding elements.

Still another object of the invention is to provide a true running assembly which is not affected by thread leads, lock washers and the like.

Yet another object of this invention is to provide a positive retainer ring assembly wherein the contact pressures between the tapered surfaces and the vertical pressure surfaces of the ring and the work element being joined to the shaft are so high that a hermetic sealing is assured, thus making the connections immune to fretting or other types of corrosion.

Other objects and advantages found in the construction of this invention will be apparent from a consideration of the following specification in connection with the appended claims and the accompanying drawings.

IN THE DRAWINGS

Figure 8:
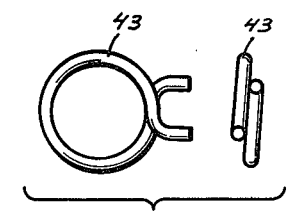

FIG. 8 includes side and end views of the spring type circular wire clamp.

Figure 9:
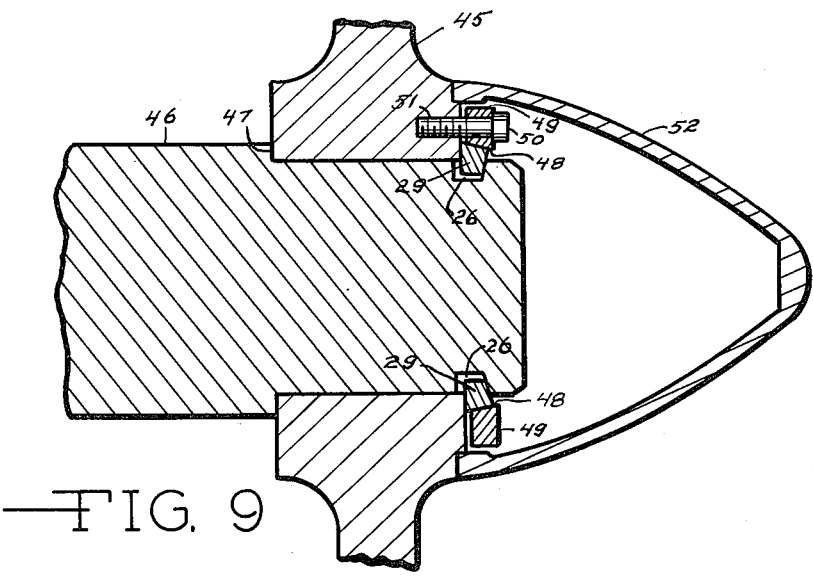

FIG. 9 is a cross-sectional schematic view of an embodiment of the positive retaining ring assembly showing its use to retain a ship's propeller to its drive shaft.

Figure 10:
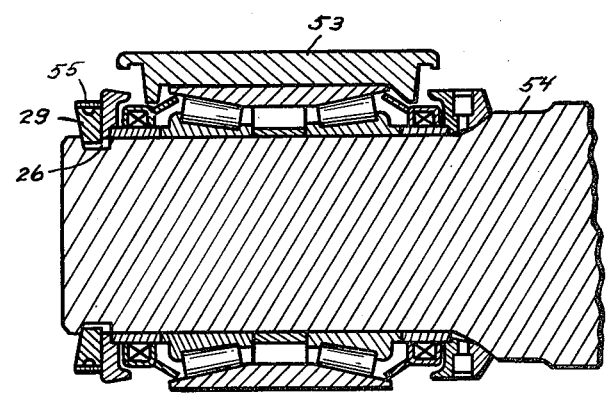

FIG. 10 is a cross-sectional schematic view of an embodiment of the positive retaining ring assembly showing its use to hold a railroad journal in positive location.

Figure 11:
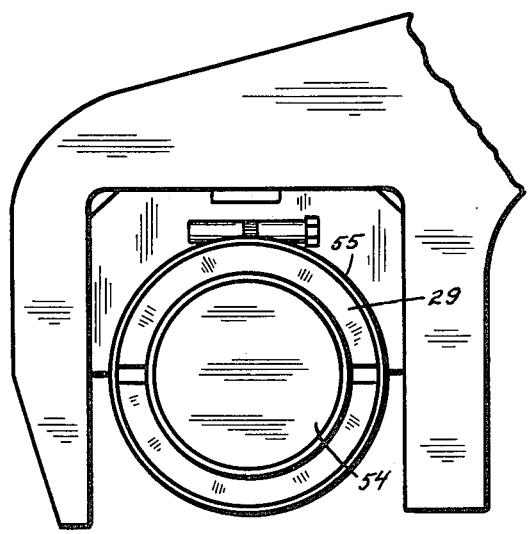

FIG. 11 is an end view showing the positive retaining ring assembly in the use application shown in FIG. 10.

Figure 12:
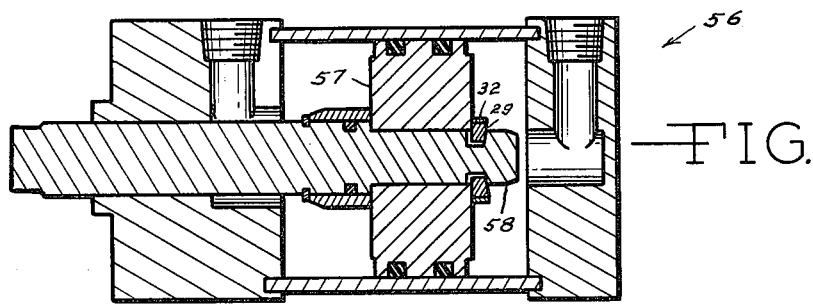

FIG. 12 is a cross-sectional schematic view of an embodiment of the positive retaining ring assembly showing its use in a high pressure air or hydraulic cylinder to hold the cylinder piston to the rod.

Figures 13, 14:
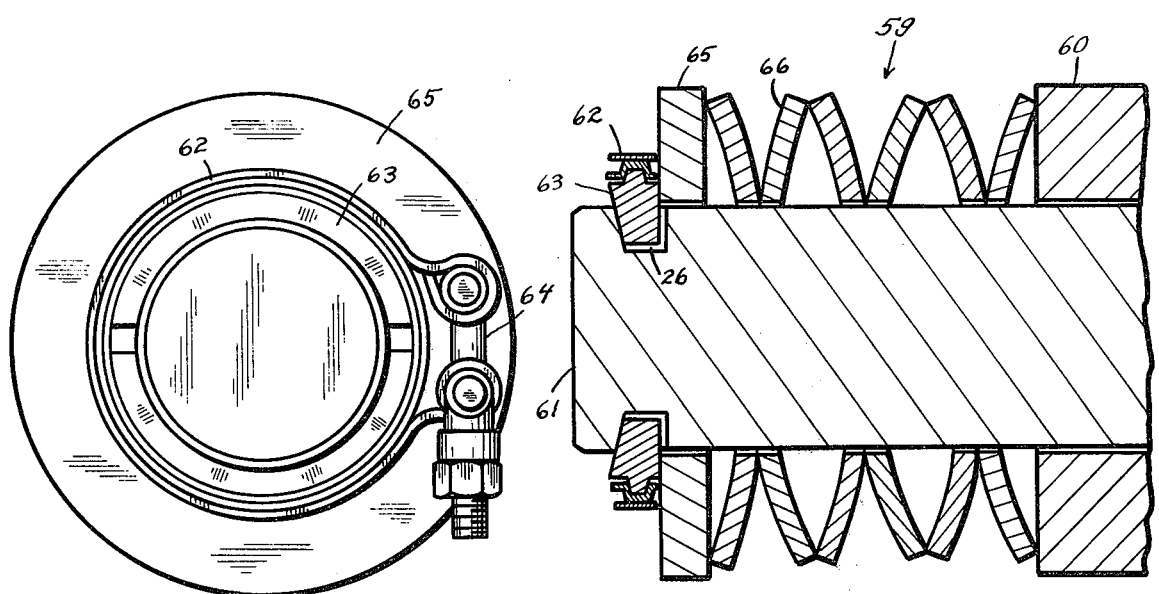

FIG. 13 is a cross-sectional schematic view of an embodiment of the positive retaining ring assembly showing its use in a heavily loaded spring assembly.

FIG. 14 is an end view showing the positive retaining ring assembly in the use application shown in FIG. 13 and illustrating the use of a band type clamp.

Figure 15:
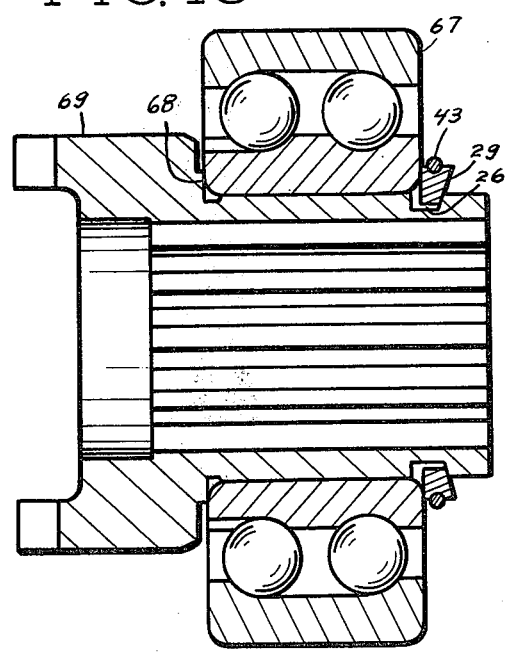

FIG. 15 is a cross-sectional schematic view of an embodiment of the positive retaining ring assembly showing its use holding a ball bearing against the shoulder of a splined power transmission shaft.

Figure 16:
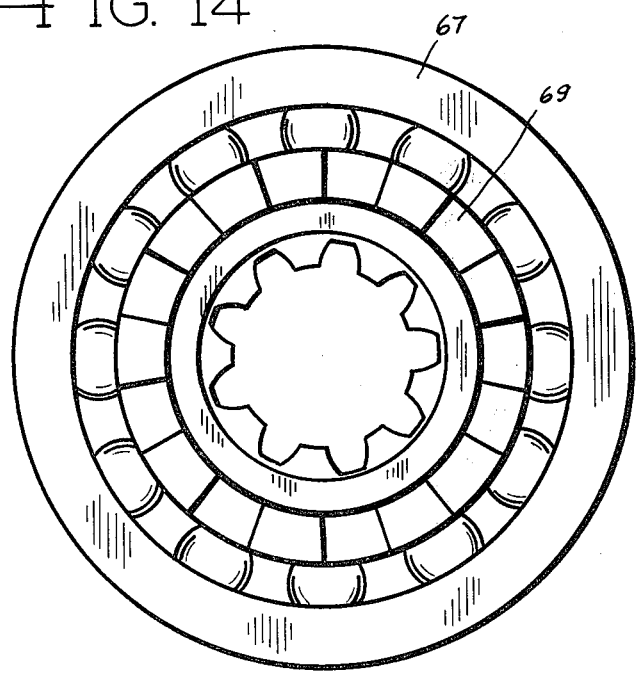

FIG. 16 is an end view of the machine part showin in FIG. 15 and showing the internal splined teeth concentric with the clutch teeth.

FIG. 17 is a cross-sectional schematic view of an embodiment of the positive retaining ring assembly showing its use in a race car wheel assembly.

Figure 18:
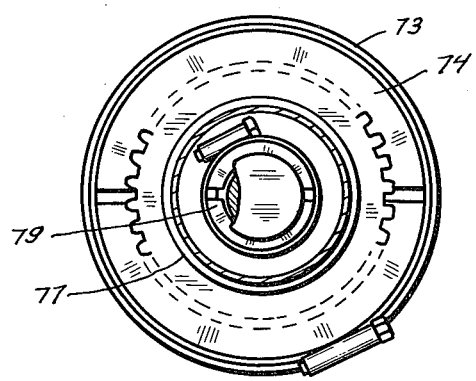

FIG. 18 is a schematic end view showing an embodiment of the invention holding wheel bearings in exact location on an axle/spindle shaft in the assembly shown in FIG. 17.

FIG. 19 is a cross-sectional schematic view of an embodiment of the positive retaining ring assembly in use to force a wheel assembly against a hub.

Figure 20:
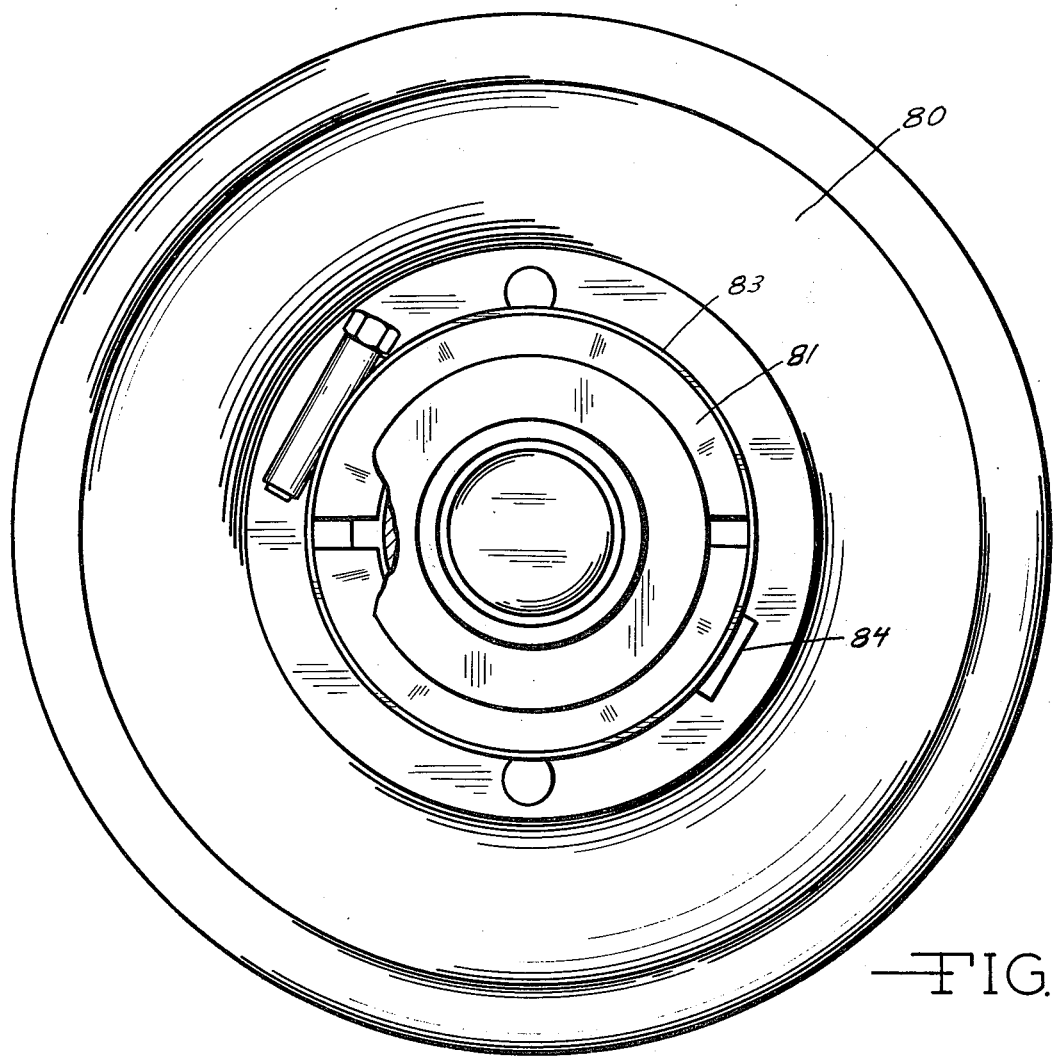

FIG. 20 is an end view of the positive retainer ring assembly as shown in FIG. 19.

DESCRIPTION OF A PREFERRED EMBODIMENT

Figure 1:
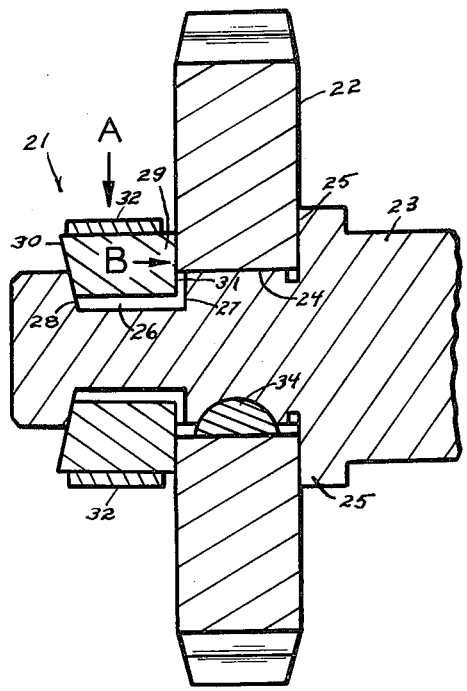
FIG. 1 is a cross-sectional schematic view of the positive retaining ring assembly whereby a radially directed tightening force is translated into an axially directed force which acts upon a work element to retain it against a work element retaining shoulder provided on the shaft.

As shown in FIG. 1, a positive retaining ring assembly 21 is shown whereby a sprocket 22 is securely mounted on a shaft or axle 23. In various other use applications, the sprocket 22 can also be any type of a work elememt such as a wheel, gear, lever, roller bearing, piston or any other similar machine part. The shaft or axle may be any rotary or oscillating power source of a machine, vehicle, ship, aircraft, or the like. The shaft 23 is provided with a work element receiving annular portion 24 upon which the sprocket 22 is mounted. Thus mounted, the sprocket 22 bears against the side surface work element retaining shoulder 25 integrally provided on the shaft 23. A separate but retained machine element can be substituted on the shaft in place of the shoulder 25. As shown, the wheel receiving portion 24 is slightly narrower than the thickness of the sprocket 22 mounted thereon.

Figure 5:
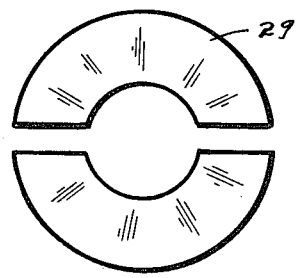
FIG. 5 is a side view of one embodiment of the segmented retaining ring utilized in the positive retaining ring assembly.

The shaft 23 is provided with an annular recess 26 adjacent the work element receiving portion 24. The annular recess 26 has a trapezoidally shaped cross-sectional configuration with a vertical side 27 and a tapered or sloping side 28 opposite thereof. In use, the sprocket 22 extends over the annular recess 26 to a slight degree as shown generally in the drawings. An annular split or segmented ring 29 is provided having substantially the same trapezoidal cross-sectional configuration as the annular recess 26 so as to have a tapered or sloping side 30 and a vertical side 31. The annular ring 29 is split or segmented as shown in FIG. 5 so as to facilitate its insertion into its operative use position within the annular recess 26. The ring 29 is split or segmented so that the segments can be urged into the recess 26 and to provide spacing so as to eliminate end interference between segments. While the annular ring 29 is shown split into two segments, it could be split into additional segments for specific applications.

In use, the segmented ring 29 is mounted within the annular recess 26 so that the vertical side 31 of the ring 29 bears against the side of the sprocket 22 and the tapered side 30 thereof engages the tapered side 28 of the annular recess 26.

Figure 2:
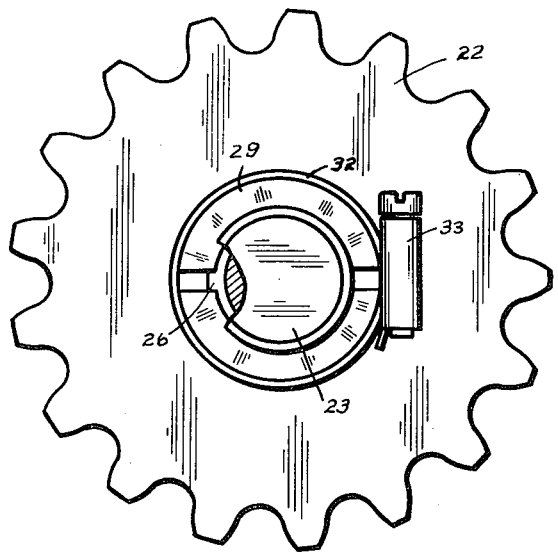
FIG. 2 is a schematic end view of the positive retaining ring assembly showing the outer tightening clamp which exerts an inward axial force against the segmented ring elements so as to wedge then into the annular recess provided on the shaft.

A tightening band or clamp 32 is mounted so as to circumferentially engage the segmented ring 29 and selectively exert a downward or inward axial pressure thereagainst as indicated by arrow A. As shown in FIG. 2, the clamp 32 is standard type of clamping band having well known tightening means 33 in association therewith. As the clamp 32 is tightened, the radial force A exerted thereby forces the segmented ring 29 radially into the annular recess 26. The tapered surface 30 of the ring bears against the corresponding tapered surface 28 of the annular recess 26 and the resultant wedging action translates the radial force A into an axial force B which acts against the side of the sprocket 22 so as to retain it positively against the shoulder 25. An axial force B of great magnitude can thus be generated by increasing the radial clamping force A which is selectively exerted against the segmented ring 29. The segmented ring 29 thus exerts a continuous retentive pressure against the side of the sprocket 22 over substantially all of the 360° of bearing area where the side 31 of the ring 29 engages the side of the sprocket 22, as contrasted to the limited area of contact provided by the five or six stud-bolt retaining means used heretofore to retain a wheel or sprocket on a shaft. The instant invention thus provides a safer and more effective means of locking a wheel, hub, sprocket, or other work elememt to a shaft which is superior to the devices of the known prior art devices. In addition, the resultant axial force B is such magnitude that it provides for greater torque transmitting capability that has not been possible with the joining or locking devices of the prior art.

Although it is not considered a part of the invention, a key 34 can be inserted between the shaft 23 and the sprocket 22 if greater torque transmitting capability is desired.

Figure 3:
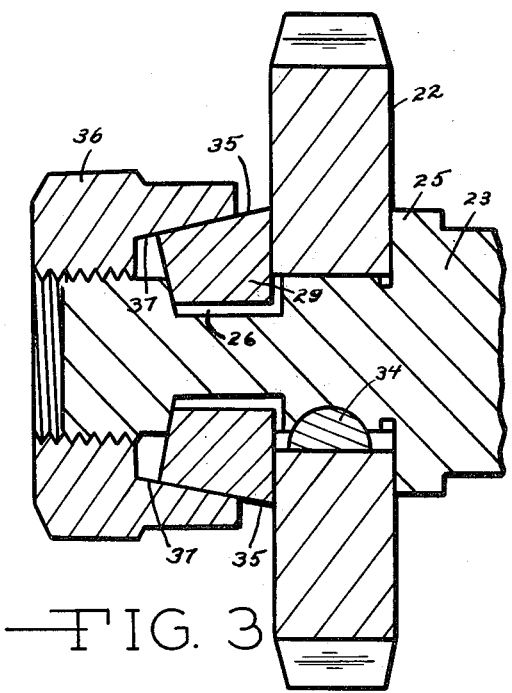
FIG. 3 is a cross-sectional schematic view of the positive retaining ring assembly showing alternate outer ring clamping means for exerting a radially directed force against the segmented retaining ring.

Another embodiment of the invention is shown in FIG. 3 whereby a modified means of clamping is provided. The annular ring 29 is modified to have a slanted upper surface 35 which slopes downwardly away from the sprocket 22 against which it is mounted. A threaded nut member 36 which threadably engages the shaft 23 is provided with an inner tapered surface 37 which operably engages the corresponding upper tapered surface 35 of the segmented ring 29. As the threaded nut member 36 is screwed onto the end of the shaft 23, it bears against the upper surface 35 of the segmented ring 29 so as to provide a wedging action which results in a radial force A that forces the segmented ring 29 into the annular recess 26 to create the axial retaining force B as previously discussed herein and as shown in FIG. 1.

Figure 4:
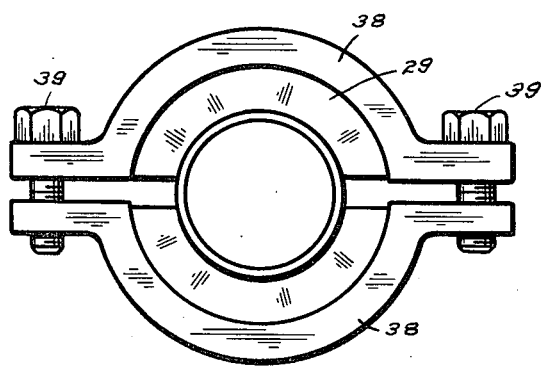
FIG. 4 is a schematic end view of the positive retaining ring assembly showing the use of opposed clamp segments to exert a radial force against the segmented retaining ring.

Another alternate means of exerting the radial clamping force A is shown in FIG. 4. Two opposed clamp segments 38 are configured to engage the upper surface of the segmented ring 29. A pair of tightening bolts 39 operably engage the clamp segments 38 so as to create an axial clamping force against the segmented ring 29 as the bolts 39 are tightened.

One embodiment of the segmented ring 29 is shown in the side view of FIG. 5 wherein the ring is split into two segments. The ring can be split into a greater number of segments if desired for specific use applications.

Figure 7:
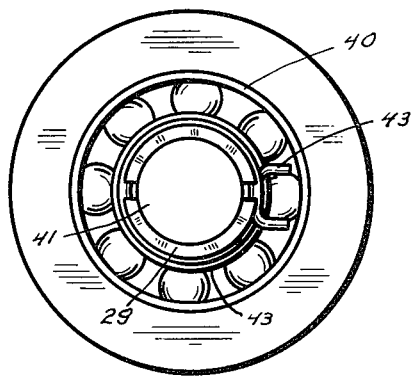
FIG. 7 is a schematic end view of the positive retaining ring assembly in the use application as shown in FIG. 6 and showing the use of the spring type wire clamp.
Figure 6:
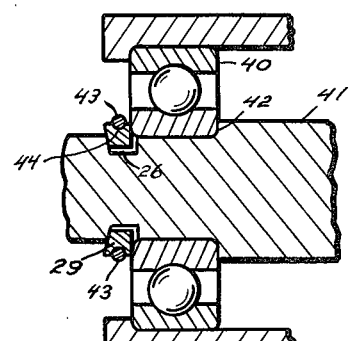
FIG. 6 is a cross-sectional schematic view of the positive retaining ring assembly utilized to retain ball bearing means on a shaft and showing the use of wire spring clamp means to exert a radial clamping force against the segmented retaining ring.

Another use application of the instant invention is shown in FIG. 6 wherein the positive retaining ring assembly is utilized to retain bearing means 40 on a shaft 41 which is provided with a bearing retaining shoulder 42. Here again the segmented ring 29 is mounted within the annular recess 26. The radial clamping force is exerted on the segmented ring 29 by a standard wire spring clamp means 43 which engages an annular spring retaining groove 44 provided in the outer circumferential surface of the segmented ring 29. The wire spring clamp 43 shown in greater detail in FIGS. 7 and 8 provides an inexpensive approach to clamping the tapered split ring segments 29 into the annular recess 26.

Still another use application of the instant invention is shown in FIG. 9 wherein a modification of the positive retaining ring assembly is utilized to operably retain a ship's propeller 45 on its shaft 46. The shaft 46 is provided with a propeller retaining shoulder 47 against which the propeller 45 bears under the axial pressure exerted by the positive retainer ring assembly. Here again as in the embodiment shown in FIG. 3, the outer circumferential surface 35 of the segmented ring 29 is tapered to engage the inner tapered surface 48 of an outer clamping ring 49 which is operably acted upon by a bolt 50 which threadably engages hole 51 provided in the propeller 45. For purposes of convenience, only one bolt 50 and mating hole 51 are shown; however, it is understood that a plurality of such bolts and holes are circumferentially provided to pass through and engage the outer ring 49. As in other previously discussed applications (particularly with respect to the threaded nut application shown in FIG. 3), the bolts 50 are tightened so as to press the outer ring 49 inwardly. The inner surface 48 thereof engages the outer taper surface 35 of the segmented ring 29 so as to force it into the annular recess 26. The resultant wedging action results in the high axial force which retains the propeller 45 against the propeller retaining shoulder 47. Not only does this hold the propeller 45 to the shaft 46 in a positive manner, preventing the possibility of the ship dropping its propeller at sea due to the usual normal thread and nut failure caused by shock and sea-water corrosive action, but the axial force provided by the instant invention prevents the entrance of corrosive sea-water to any mating surfaces of the positive retaining ring assembly joining the propeller to its drive shaft. The protective shroud 52 is a cavitation protection device and is not considered a part of the invention.

As shown in FIG. 10, another use application of this invention is to secure a railroad journal 53 to its axle shaft 54. A heavy band clamp 55 is utilized to impart a radial force against the segmented ring 29 so as to wedge it into the recess 26 so as to impart an axial force against the railroad journal assembly, thereby positively retaining it in its seating housing on the axle shaft 54. It is thus seen that a less expensive method of holding the bearing journal to its axle shaft is provided without sacrificing any railroad safety factors. Further, this invention allows the roller bearing assemblies to be installed with exact design preload conditions which lead to a long and safe life of the bearings. This is not always possible when using threaded elements as retaining means due to the fact that an angular force is exerted on the shaft and bearings by the nature of the threads themselves. An end view of the railroad journal assembly 53 is shown in FIG. 11 which shows the band clamp 55 acting upon the segmented ring 29 in the manner previously described. It should be noted that the inner surface of the band 55 is provided with a bead portion which engages a mating groove provided in the outer surface of the segmented ring 29.

As shown in FIG. 12, this invention may also be used in a high pressure air or hydraulic cylinder assembly 56 to safely, positively and inexpensively secure the cylinder piston 57 to the piston rod 58. As previously described, a band clamp 32 or spring wire clamp 43 as shown in FIG. 8 may be utilized to exert a radial force against the segmented ring 29 with the resultant retentive axial force being exerted against the side of the piston 57. Thus, this invention would eliminate the machined threads now customarily used and which can be damaged by cross threading at assembly or during servicing. Such threads can also loosen due to shock loads thus causing the cylinder to fail. If such cylinders were on airborne or undersea applications, such failure could have disastrous and often fatal applications. It is thus seen that this invention will eliminate future mechanical threading failure as well as save the cost of machining the threads while providing a safe and failure-free method of mechanically attaching pistons to piston rods.

Another modification of the positive retainer ring assembly is shown in FIG. 13 whereby a heavy duty spring assembly 59 is retained against a housing 60 on a shaft 61. A heavy duty band clamp 62 selectively actuated by tightening means 64 is adapted to engage the upper surface of a segmented ring 63 so as to exert a radial force thereagainst. The segmented ring 63 is thus wedged into the annular recess 26 so as to exert an axial force against the slip thrust ring 65 which safely retains the spring elements 66 on the shaft 61 and bearing against the housing 60. The shear strength of the segmented ring 63 greatly exceeds that of any amount of retaining bolts that could be installed in the same space, thus making this invention a safer method of retaining springs, or any other type of machine element which imparts compressive or expansive forces, as well as being easier and less expensive to machine, install and maintain. The heavy duty clamp member 62 has a retaining "vee" cross-sectional configuration which matingly engages the raised outer surface of the segmented ring 63. As shown in FIG. 14, tightening means 64 are utilized to selectively tighten the clamp member 62 so a to exert an axial force against the thrust ring 65 which retains the springs 66 at the proper compressive tension against the housing 60.

As shown in FIG. 15, this invention can also be used to hold a precision ball bearing 67, positively and without backlash, against the shoulder 68 of a splined power transmission shaft 69. This is part of a toothed coupling which engages at high speed and with considerable shock at frequent intervals in a machine tool cycle operation, such as a spindle drive, or gear box drive. In this use application, the positive retainer ring assembly is similar to that shown in FIG. 8 wherein a spring wire circular type clamp 43 acts upon the segmented ring 29 so as to wedge it into the annular recess 26 provided on the power transmission shaft 69. Thus, the bearing 67 is held in assembly with the clutch half shaft 69 ready for installation in the machine tool proper.

The total assembly of the shaft 69 and bearing 67, as further shown in the end view of FIG. 16, is thus held positively without distortion from angular forces such as would occur if threaded elements were used for such a purpose and must run true about the assembly centerline. Thus, this invention provides a simple and inexpensive way to make such an assembly and to inspect and check run-out tolerances prior to final installation.

Another use application of this invention is shown in FIG. 17 which illustrates a typical race car wheel commonly used in Formula 500 and Grand Prix formula types of race cars which have a spline or toothed configuration circumferentially about the axle or spindle shaft 70 for torque transmission between engine or brakes to the wheel and tire assembly 71 whereby a race car wheel 71 is positively held against the axle-spindle shaft hub 72. A fast acting, radially balanced clamp ring 73 exerts a radial clamping force to wedge the ring segments 74 into the annular recess 75 in the manner previously described herein so as to exert an axial retaining force against the wheel 71. It is thus seen that this invention replaces the traditional race car wheel retaining means which include the use of winged nuts and fine threaded means at the end of the axle-spindle shaft. These threads must be clockwise or counterclockwise depending on the normal (forward) rotational direction of the wheel sio as to prevent the nut from coming loose due to gravitational rotational forces at high speeds. The use of such threaded means are expensive due to the difficulty in machining them in a precise and concentric manner. In addition, they are easily damaged by being struck accidentally by mechanic's tools, by dirt, sand and oil and contact with competing cars. Such damage has heretofore made it difficult to remove the nut and replace it under extreme conditions which exist in race pits during competitive events. This invention provides a less expensive method of safely retaining the wheel to its shaft. In addition, it is not affected by debris from the track due to the fact that the tapered mating surfaces of the positive retaining ring assembly are not exposed to normal damage such as threads are. Thus, the positive retaining ring assembly can be easily and quickly removed and replaced when necessary to change a wheel during a race event.

As further shown in FIG. 17, a tapered roller bearing assembly 76 is retained on the spindle axle shaft 70 by use of the instant invention. It is thus possible to properly apply the exact pre-load necessary to have the tapered roller bearing assembly 76 in proper design condition to maintain the radial and thrust loadings recommended by the manufacturers of such precision bearings. In this use application, both of the clamps 73 and 77 are provided with interior circumferential beads fitting into mating annular grooves in the outer circumferential surface of the split ring segments 74 and 79, respectively, to hold them in true location in this application where safety is of paramount importance. The end view of FIG. 18 shows the clamps 73 and 77 in their operative use positions as shown in FIG. 17. Clamp 77 which retains the tapered wheel bearing 76 need not be balanced since it does not rotate. The tire portion 78 is shown in FIG. 17.

This invention can also be utilized to retain wheel assemblies on NASCAR classes of competition stock cars. The wheel assembly 80 is retained on the hub 85 by use of the segmented ring 81 which is wedged into its mating annular groove 82 by a balanced external clamp ring 83 which utilizes a balance weight 84 as shown in the end view of FIG. 20. The balanced clamp ring 83 prevents vibrations due to the high rotational and dynamic forces which develop at the speeds run by this type of race car. Under the influence of the radial force imparted by clamp ring 83, the segmented ring 81 exerts an axial force against the wheel assembly 80 so as to positively hold it against the hub 85 without the need of the five or six nuts and stud means normally found on such an assembly. This invention would only require one drive stud 86 (or perhaps two for dynamic and static balance purposes) to assure full torque transmission between axle and wheel. Here again, and as previously discussed, this positive retainer ring assembly provides a positive, safe wheel retention system. Since speed of wheel changing is of utmost importance in stock car racing, the omission of five or six nut and stud retaining means allows the mechanics to remove and replace a wheel with only one clamp 83 to remove and replace. This not only speeds up the wheel changing operation, but greatly contributes to the safety of the driver and spectators because it eliminates the possibility of a car reentering a race with missing wheel retaining nuts. The use of the positive retaining ring system in this racing application eliminates the danger of stud breakage and resultant wheel failure due to the extremely high side loading effects during cornering maneuvers. This safety factor is due to the almost complete 360 degree retentive axial pressure exerted by the segmented ring 81 against the wheel assembly 80 where its abuts the hub 85 instead of the 35 percent effective holding area provided by the traditional five or six stud-bolt retaining means. In addition, the elimination of the stud-bolt holding means provides a weight reduction of the wheel (referred to as an unsprung weight in race car terminology) so as to effectively increase the performance of the vehicle. The wheel assembly as shown in FIG. 19 also illustrates the use of the invention to retain tapered bearings 76 as previously discussed with respect to FIG. 17.

The end view of FIG. 20 shows the wheel assembly of FIG. 19 and illustrates the clamp means 83 and the associated weight 84. It is thus seen that a positive retainer ring assembly is provided for axially securing a work element to shaft which is simple in operation and which is less expensive than the devices of the prior known art. The positive retainer ring assembly exerts an axial retentive force against the side of the work element so as to securely retain it against a work element retaining shoulder provided on the shaft.

From this presentation of several operative embodiments of my invention, improvements, modifications and substitutions will become apparent to those skilled in the art. Such improvements, modifications and substitutions are intended to be included within the spirit of the invention limited only by the scope of the hereinafter appended claims.

I claim:

1. In a positive retaining ring assembly for axially securing a work element to a shaft, the combination including:
   a shaft adapted to axially receive a work element thereon, said shaft having an annular work element retaining shoulder means thereon, said shaft provided with an annular recess proximate to said shoulder means, said annular recess having essentially a trapezoidal dross-sectional configuration open on a parallel side;
   a segmented ring having a trapezoidal cross-sectional configuration with an outer circumferential surface normal to the axis of said ring, said ring adapted to matingly engage said annular recess and the side of a work element mounted on the shaft intermediate said recess and said shoulder means; and
   clamping means provided in operative engagement with the outer circumferential surface of said segmented ring, said clamping means adapted to move radially inwardly against said segmented ring so as to selectively exert a direct inward radial force upon said segmented ring normal to the outer circumferential surface thereof and wedge said ring radially into said recess whereby said ring exerts a resultant axial retentive force against the side of the work member to lockably retain said work member against said shoulder means.

2. In the positive retaining ring assembly of claim 1 wherein the segmented ring has a vertical work element engaging surface and a tapered recess engaging surface opposite said vertical work element engaging surface.

3. In the positive retaining ring assembly of claim 1 wherein the clamping means comprises a pair of clamp segments adapted to matingly engage the outer circumferential surface of the segmented ring, said clamp segments joined by a pair of tightening bolts.

4. In the positive retaining ring assembly of claim 1 wherein the clamping means comprises a band clamp member provided with tightening means in association therewith.

5. In the positive retaining ring assembly of claim 1 wherein the segmented ring is provided with an annular groove in the outer circumferential surface thereof.

6. In the positive retaining ring assembly of claim 5 wherein the clamping means comprises a circular spring wire clamp adapted to matingly engage said annular groove provided in the outer surface of said segmented ring.

7. In the positive retaining ring assembly of claim 1 wherein the outer circumferential surface of the segmented ring is provided with a raised annular bead portion.

8. In a ring assembliy as defined in claim 1 wherein the
   shaft is provided from a housing member, said shaft provided with an annular recess having a trapezoidal cross-sectional configuration, said shaft adapted to retain a slip thrust ring and spring member intermediate said annular recess and said housing;

a segmented ring having a trapezoidal cross-sectional configuration, said ring adapted to matingly engage said annular recess and the side of the slip thrust ring mounted on said shaft; and clamping means provided in operative engagement with the outer circumferential surface of said segmented ring, said clamping means adapted to selectively exert an inward radial force upon said segmented ring so as to wedge said ring into said recess whereby said ring exerts a resultant axial retentive force against the side of the slip thrust ring so as to maintain the spring member in compression against housing.

9. In a positive retaining ring assembly for axially securing a work element to a shaft, the combination including:

a shaft adapted to axially receive a work element thereon, said shaft having an annular work element retaining shoulder means thereon, said shaft provided with an annular recess proximate to said shoulder means, said annular recess having a trapezoidal cross-sectional configuration;

a segmented ring having a trapezoidal cross-sectional configuration, said ring adapted to matingly engage said annular recess and the side of a work element mounted on the shaft intermediate said recess and said shoulder means, said segmented ring provided with an annular groove in the outer circumferential surface thereof;

clamping band means provided in operative engagement with the outer circumferential surface of said segmented ring, said clamping band means having a raised bead portion provided on the inner surface thereof, said raised bead portion adapted to matingly engage said annular groove provided in the outer circumferential surface of said segmented ring, said clamping band means adapted to selectively exert an inward radial force upon said segmented ring so as to wedge said ring into said recess whereby said ring exerts a resultant axial retentive force against the side of the work member to lockably retain said work member against said shoulder means.

10. In a positive retaining ring assembly for axially securing a work element to a shaft, the combination including:

a shaft adapted to axially receive a work element thereon, said shaft having an annular work element retaining shoulder means thereon, said shaft provided with an annular recess proximate to said shoulder means, said annular recess having a trapezoidal cross-sectional configuration;

a segmented ring having a trapezoidal cross-sectional configuration, said ring adapted to matingly engage said annular recess and the side of a work element mounted on the shaft intermediate said recess and said shoulder means, said segmented ring provided with a raised annular bead portion in the outer circumferential surface thereof;

clamping band means provided in operative engagement with the outer circumferential surface of said segmented ring, said clamping band means having a recesses portion along the inner surface thereof, said recessed portion adapted to matingly engage said raised annular bead portion provided on the outer circumferential surface of said segmented ring, said clamping band means adapted to selectively exert an inward radial force upon said segmented ring so as to wedge said ring into said recess whereby said ring exerts a resultant axial retentive force against the side of the work member to lockably retain said work member against said shoulder means.

* * * * *